United States Patent [19]
Johnston et al.

[11] Patent Number: 5,844,795
[45] Date of Patent: Dec. 1, 1998

[54] DIAGNOSTIC AID FOR INDUSTRIAL CONTROLLER USING MULTI-TASKING ARCHITECTURE

[75] Inventors: David Johnston, Mentor; Charles M. Rischar, Chardon; Jennifer McDonel, Bedford, all of Ohio

[73] Assignee: Allen Bradley Company, LLC, Milwaukee, Wis.

[21] Appl. No.: 651,647

[22] Filed: May 22, 1996

Related U.S. Application Data

[63] Continuation-in-part of Ser. No. 551,606, Nov. 1, 1995.
[51] Int. Cl.$^6$ ..................................................... G05B 19/42
[52] U.S. Cl. .......................... 364/188; 364/131; 364/146; 364/468.05; 364/468.06
[58] Field of Search ..................................... 364/188, 131, 364/133, 138, 146, 147, 191, 192, 468.05–468.07; 395/82, 84, 670, 650, 376, 395

[56] References Cited

U.S. PATENT DOCUMENTS

| | | | |
|---|---|---|---|
| 4,172,289 | 10/1979 | Struger et al. | 364/900 |
| 5,212,631 | 5/1993 | Schmidt et al. | 364/136 |
| 5,400,246 | 3/1995 | Wilson et al. | 364/146 |
| 5,404,520 | 4/1995 | Sonobe | 395/650 |
| 5,485,620 | 1/1996 | Sadre et al. | 395/700 |
| 5,530,643 | 6/1996 | Hodorowski | 364/191 |
| 5,636,124 | 6/1997 | Rischar et al. | 364/468.06 |

*Primary Examiner*—Reba I. Elmore
*Assistant Examiner*—Ramesh Patel
*Attorney, Agent, or Firm*—Keith M. Baxter; John M. Miller; John J. Horn

[57] ABSTRACT

A task executed on a multi-tasking industrial controller is employed to monitor data exchanged between a control program (executed as a second task on the industrial controller) and the controlled process. The monitoring task, which may be invoked on a periodic basis, reads designated data, compares it to its last value and if it changes, stores the value in a buffer. A separate program reads this buffer and displays relevant information to the user minimizing degradation in the performance of the control program and eliminating the possibility of corruption of the control program as would be required for the introduction of special memory trapping instructions into the control program.

12 Claims, 10 Drawing Sheets

| OCCURENCE | INITIATION TIME |
|---|---|
| SLOWLOOP | 10274000 |
| FASTLOOP | 10274025 |
| WATCHDOG (TEMP PID) | 10279000 |
| WATCHDOG (FLOW PID) | 10284000 |
| | |

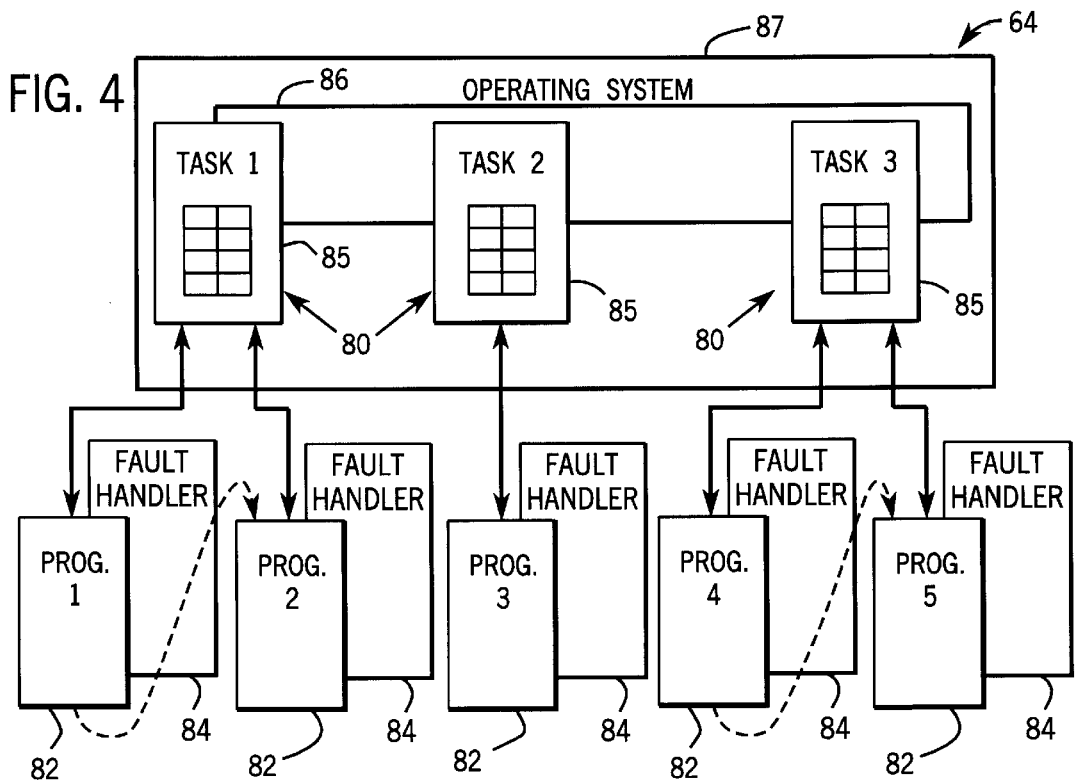

| TASK | PRIORITY |
|---|---|
| SLOW LOOP | 10 |
| FAULT | 6 |
| FILL | 8 |
| MAIN | 24 |

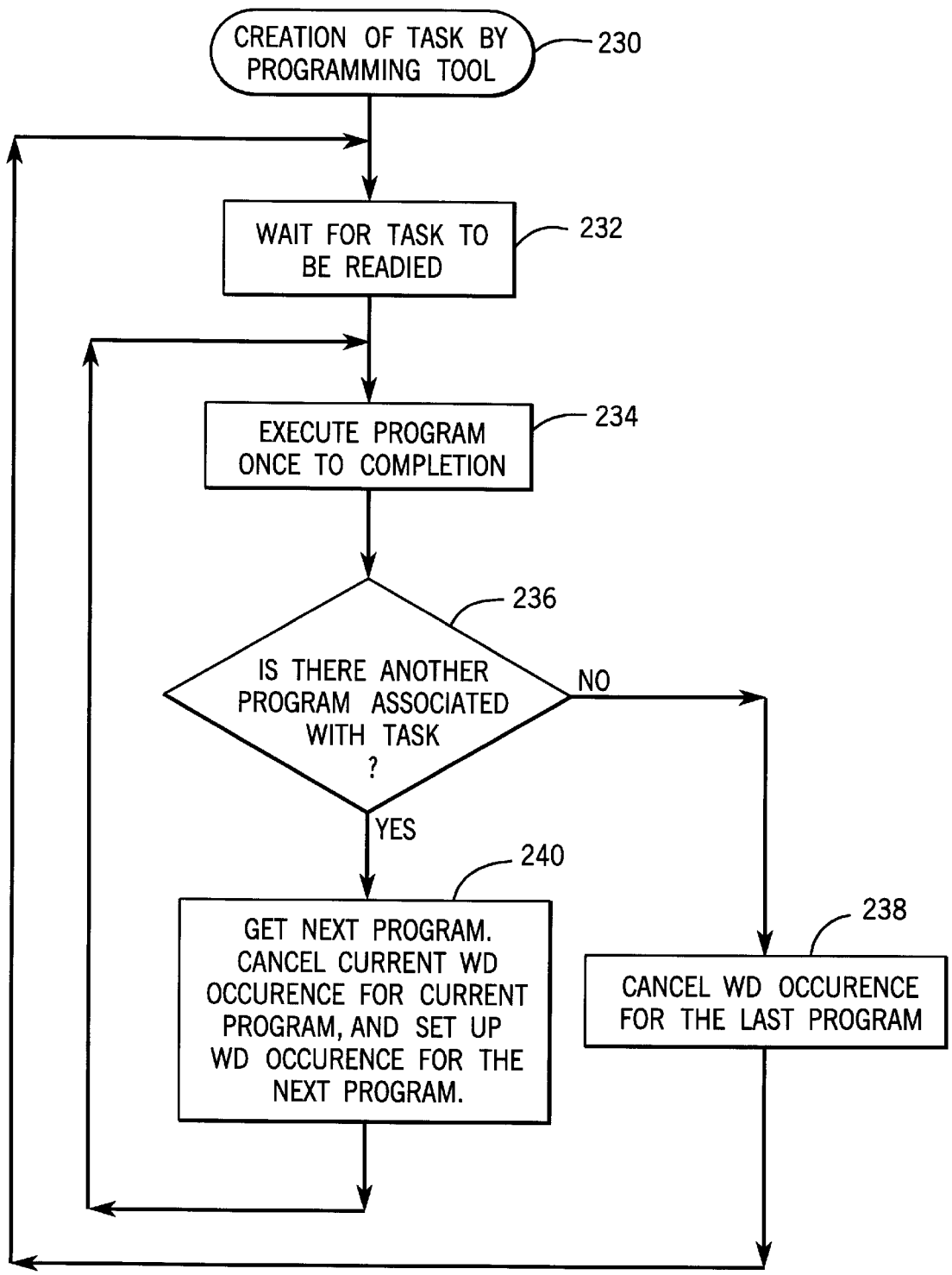

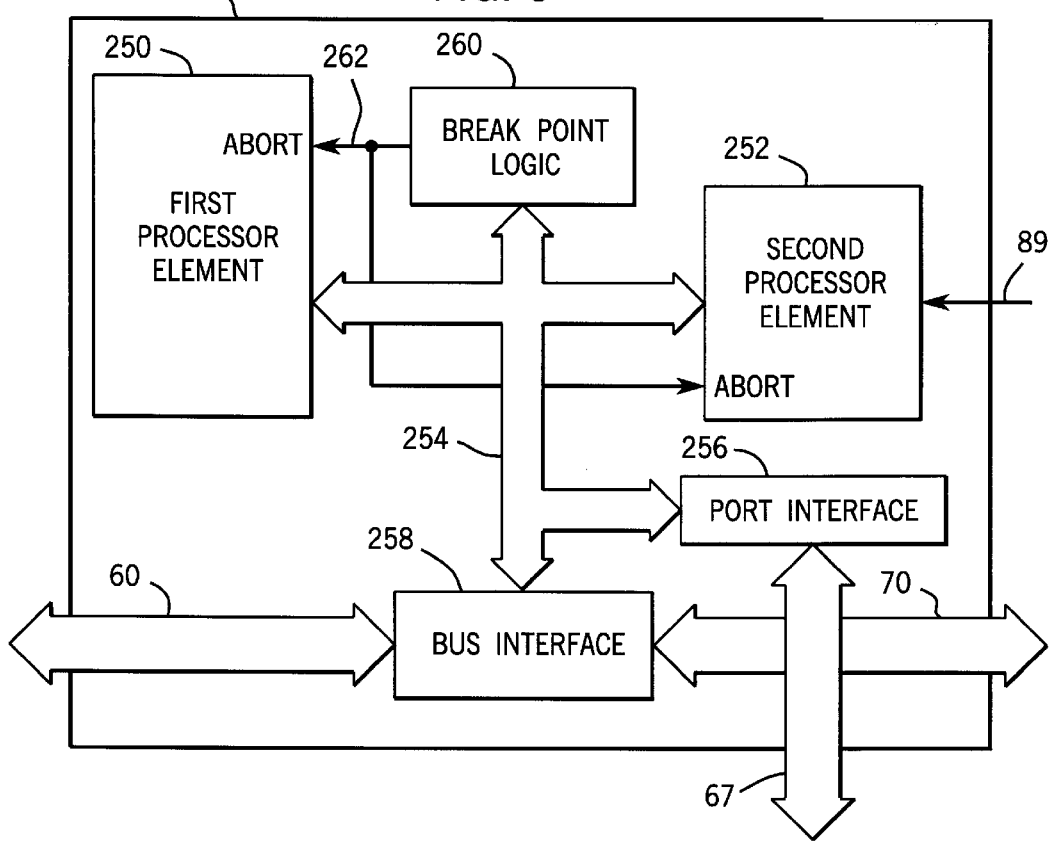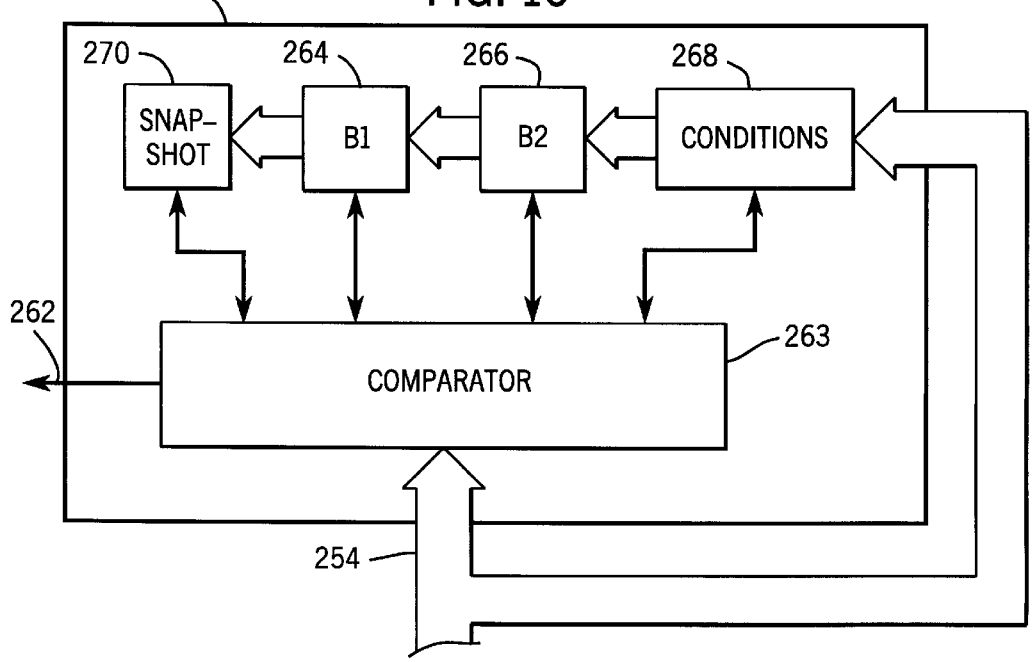

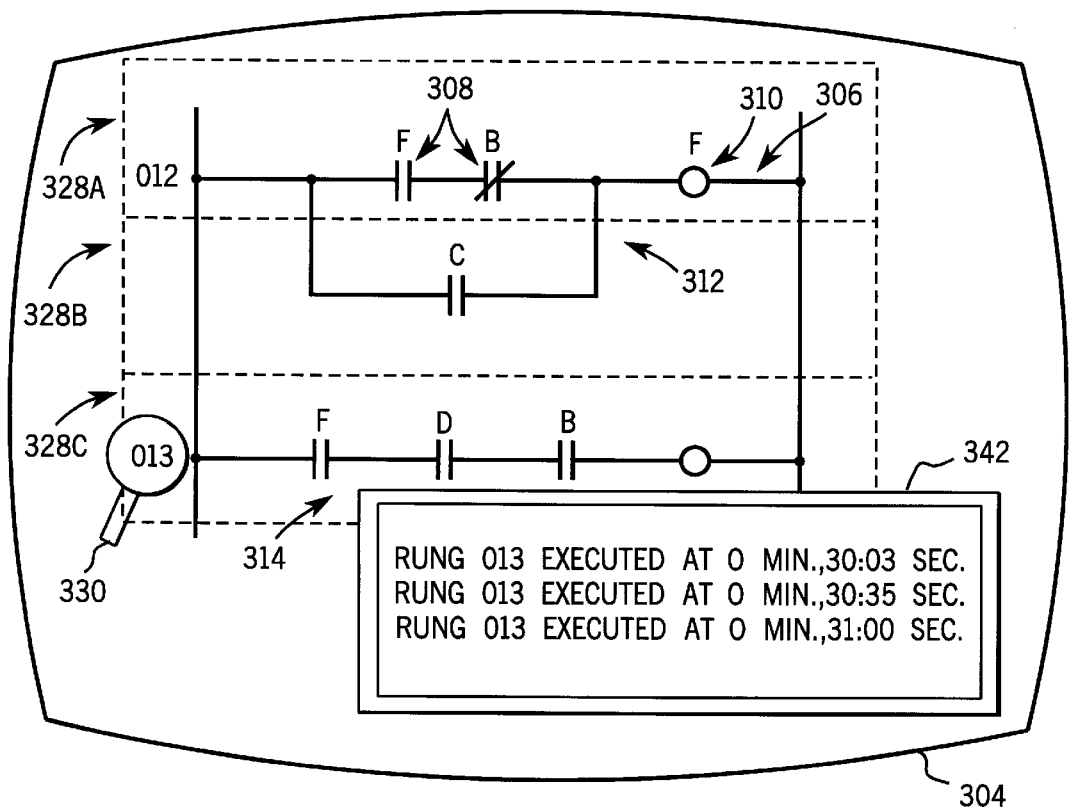
FIG. 11
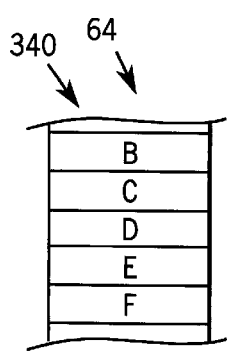
FIG. 12
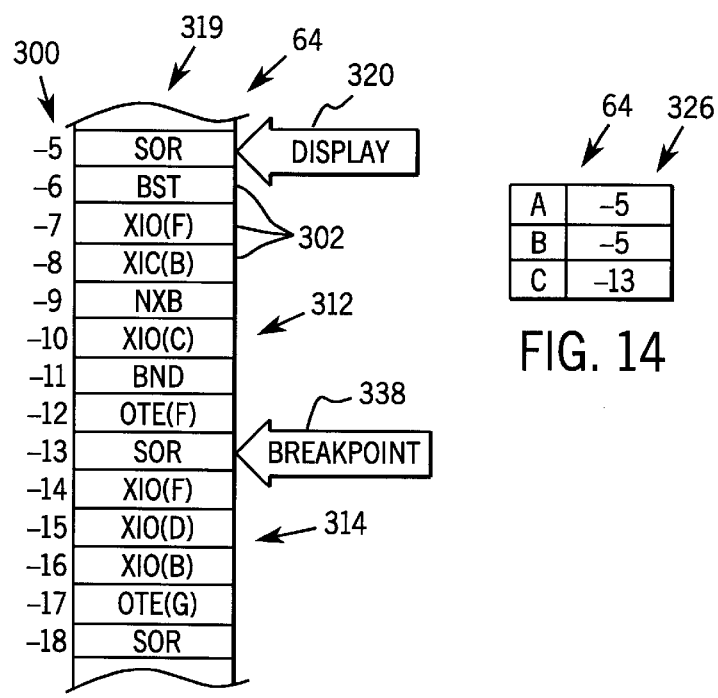
FIG. 13
FIG. 14

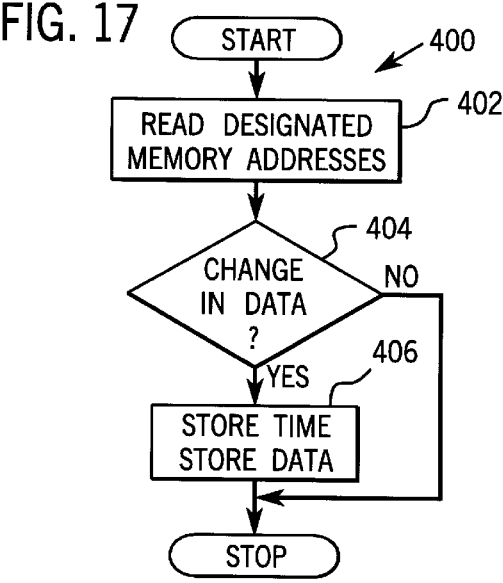
FIG. 17
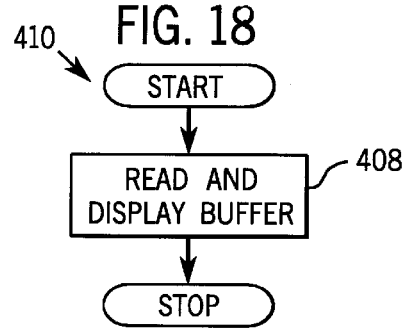
FIG. 18
FIG. 19
(full-page patent figure)

DIAGNOSTIC AID FOR INDUSTRIAL CONTROLLER USING MULTI-TASKING ARCHITECTURE

This application is a continuation in part of U.S. application Ser. No. 08/551,606 filed Nov. 1, 1995, now allowed.

FIELD OF THE INVENTION

The present invention relates to multi-tasking industrial controllers used for the "real-time" control of industrial processes, and in particular to an input/output monitoring program that runs concurrently with a control program to display values of inputs and outputs used by the control program.

BACKGROUND OF THE INVENTION

Industrial controllers are special purpose computers used for controlling industrial processes or equipment. Under the direction of a stored program, the industrial controller examines a series of inputs reflecting the status of the controlled process and changes outputs effecting control of the process. The inputs and outputs are most simply binary, that is "on" or "off"; however, analog inputs and outputs, taking on a continuous range of values, are also used.

Industrial controllers may be programmed in a "relay ladder" language where instructions are represented graphically by "contacts" and "coils" of virtual relays connected together in ladder-like rungs. This relay ladder language, with its input contacts and output coils, reflects the emphasis in industrial control on the processing of large amounts of input and output data. The relay ladder language also reflects the fact that most industrial control is "real-time"; that is, an ideal industrial controller behaves as if it were actually composed of multiple relays connected in parallel rungs to provide outputs in essentially instantaneous response to changing inputs.

Other graphic industrial control languages are also used including: function block languages which represent instructions as functional blocks having inputs and outputs connected to the inputs of other functional blocks.

The need for the control program to operate correctly in real-time subject to timing constraints of a physical process and in response to the data it receives from the controlled process presents a special problem in troubleshooting control programs. Normally troubleshooting a control program requires that it be operated with the actual controlled equipment.

In such circumstances, it would be desirable to have a clear picture of input and output data transmitted between the control program and the controlled process in order to understand possible errors in the control program. While the state of some inputs and outputs can be readily verified visually by the programmer, because of visually apparent changes in the controlled process, for example, motor stopping and starting, not all such data is naturally displayed. In particular, data that changes rapidly may not be detected in this manner. Often the timing of two elements of rapidly changing data must be established to see which data changes first. In this case it would be desirable to monitor more than one piece of data at a time.

SUMMARY OF THE INVENTION

The present invention provides a method of tracking changes in input and output data while the control program is being executed, that requires no special modification of the control program and no special hardware other than a industrial controller capable of operating multiple tasks concurrently. In the invention, a special monitor program is loaded into the industrial controller to be run as a scheduled or event driven task separate from the control program task. The monitor allows input and output data to be viewed on an ad hoc basis. Multiple data can be monitored and displayed with a high time resolution.

Specifically, the invention is a method of displaying the real-time status of input or output data exchanged between a multi-tasking industrial controller, executing a control program, and a controlled process. The method includes the steps of executing the control program as a first of at least two concurrent tasks on the multi-tasking industrial controller. An input from a user, identifying an input output datum referenced by the control program, is used to determine a memory location in the industrial controller holding the input or output data. A memory monitor program is then generated to run as a second of the two tasks on the multi-tasking industrial controller concurrently with the control program. The memory monitor program receives the memory location and records a time of change in the data. The data and time of changes may then be displayed.

Thus, it is one object of the invention to provide a useful troubleshooting tool for use in industrial controllers capable of executing multiple tasks concurrently. By placing the monitor program in a separate task, the control program is never modified, eliminating the possibility of corrupting the program that one is attempting to correct.

It is another object of the invention to provide a troubleshooting system that provides real-time display of input and output data but that does not require specialized hardware for monitoring the actual exchange of data with the industrial controller. The program may be run on any multi-tasking industrial controller.

The particular input or output data to be monitored by the user may be identified by first displaying on an electronic display a graphical representation of a portion of the control program referencing the input or output data as an operand. The display may include a tag name which can be referenced to the particular memory location to be monitored.

Thus it is another object of the invention to provide a method of monitoring input and output data as it is logically referenced in the control program. In a troubleshooting situation where a particular portion of the control program is being examined, the relevant input and output data is easily identified.

The operation of displaying the monitored data may be executed by yet another program running independently of the control program and the monitoring program even possibly running on a different electronic computer.

Thus, it is another object of the invention to provide a software monitoring tool that may be invoked frequently, in order to accurately capture times of changes of data, without unduly burdening or slowing the operation of the control program. By using a third independent program task to display the data, the time consuming refreshing and transmitting of data to a visual display need not be performed at the same rate or at the same time as the monitoring operation. Thus, the monitoring program is required only to read data, compare it with its previous value and to write a time to a buffer, a series of operations that can be performed rapidly.

The foregoing and objects and advantages of the invention will appear from the following description. In the description, references made to the accompanying drawings which form a part hereof, and in which there is shown by way of illustration, a preferred embodiment of the invention. Such embodiment does not necessarily represent the full scope of the invention, however, and reference must be made, therefore, to the claims for interpreting the scope of the invention.

BRIEF DESCRIPTION OF THE DRAWINGS

FIG. 4 is a schematic representation of the multiple tasks and their associated programs in the memory of the controller of FIG. 1, each program having an associated fault handler;

FIG. 5 is a task scheduling table providing information entered by the user used for scheduling the tasks to make best use of the processor resources;

FIGS. 7(a), 7(b) and 7(c) are simplified flow charts of the operating system as it executes on the controller of FIG. 1 for periodic and event triggered tasks;

FIG. 8 is table representation of a ready list providing a queue of pending tasks;

FIG. 9 is a yet more detailed block diagram of the processor of the controller of FIG. 2 and FIG. 3 showing the breakpoint circuitry used to detect the accessing of particular memory locations by either of two processor elements of the subprocessor of FIG. 3 to provide a breakpoint signal to one processor element;

FIG. 10 is a block diagram in yet farther detail of the breakpoint circuitry of FIG. 9 showing the registers used to program a comparator for generating the breakpoint signal;

FIG. 11 is a simplified representation of the display of a user terminal representing the control program depicted as interconnected graphical elements and showing a magnifying glass cursor for selecting one "rung" of graphical elements for monitoring and showing a histogram window detailing the execution of that rung;

FIGS. 12, 13, and 14 are schematic representations of the memory of the processor of FIG. 2 showing separate areas of storage for input and output values of the control program and a table linking addresses of the control program to the location on the display of FIG. 11 of their corresponding graphical elements;

FIG. 17 is a flow chart depicting a monitoring program that may be run on a multi-tasking operating system to provide tracking of input and output data;

FIG. 18 is a flow chart similar to that of FIG. 17 depicting a display program displaying the data collected by the monitoring program of FIG. 17 to a user; and FIG. 19 is a representation of a display on the user's terminal defining fields for data entry by the user to identify input or output data for the monitor program of FIG. 18 to monitor.

DETAILED DESCRIPTION OF THE PREFERRED EMBODIMENT

Figure 1:
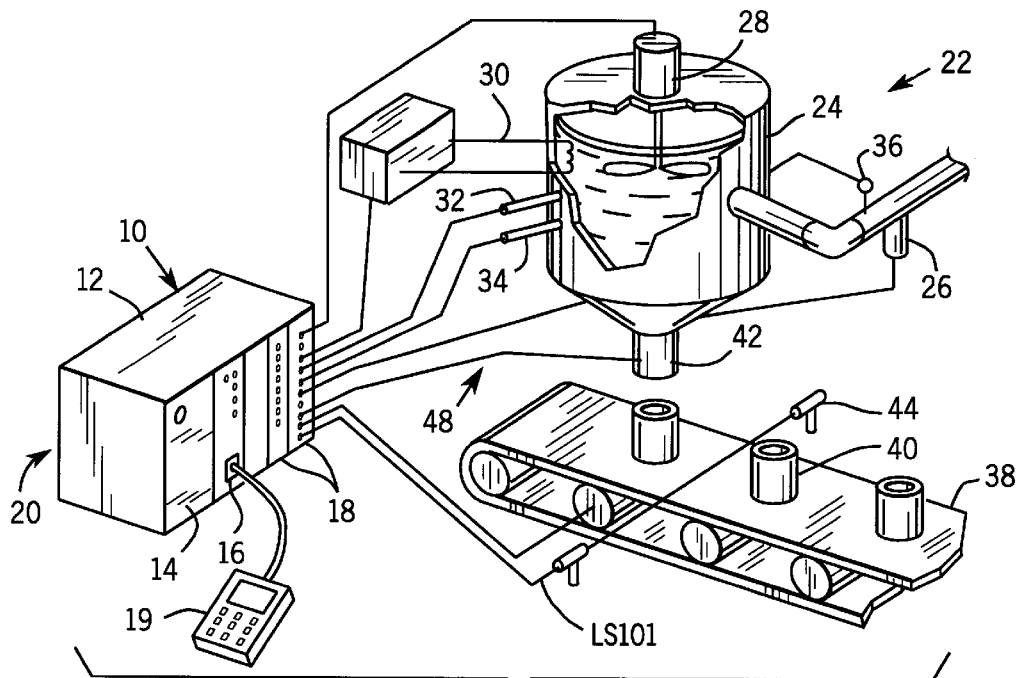
FIG. 1 is a perspective view of a simplified industrial control process having a conveyor line and a mixing tank as may be controlled by one industrial controller employing a multi-tasking operating system.

Referring now to FIG. 1, the monitoring software of the present invention is preferably implemented with a multi-tasking operating system which permits an automation controller 10 to execute with apparent simultaneity a number of different tasks associated with the controlled equipment 22. Accordingly, the part (I) of this specification describes this operating system and the hardware and software employed in this multi-tasking controller, parts of which are used in the present invention. Part (II) of this specification describes a hardware implementation of a histogram generator similar to the present invention and claimed in a co-pending application. Part (III) of this application describes the software implementation of the histogram generator of the present invention.

I. A Multi-Tasking Automation Controller

1. An Example Industrial Process

In the process shown, the automation controller 10 is connected to a mixing tank 24 where it controls the flow of materials into the tank via a valve 26 and the temperature and agitation of those materials via an agitator 28 and a heater 30 under feedback control via signals obtained from a thermocouple 32, a pressure transducer 34 and a flow sensor 36. Thus, the temperature of the material contained in the tank 24 may be regulated in a feedback loop by means of the thermocouple 32 and the heater 30. Likewise, the flow may be regulated in a feedback loop with valve 26 and flow sensor 36. An additional feedback loop may regulate the pressure within the tank 24 as a more complex function of temperature and flow rate.

Figure 2:
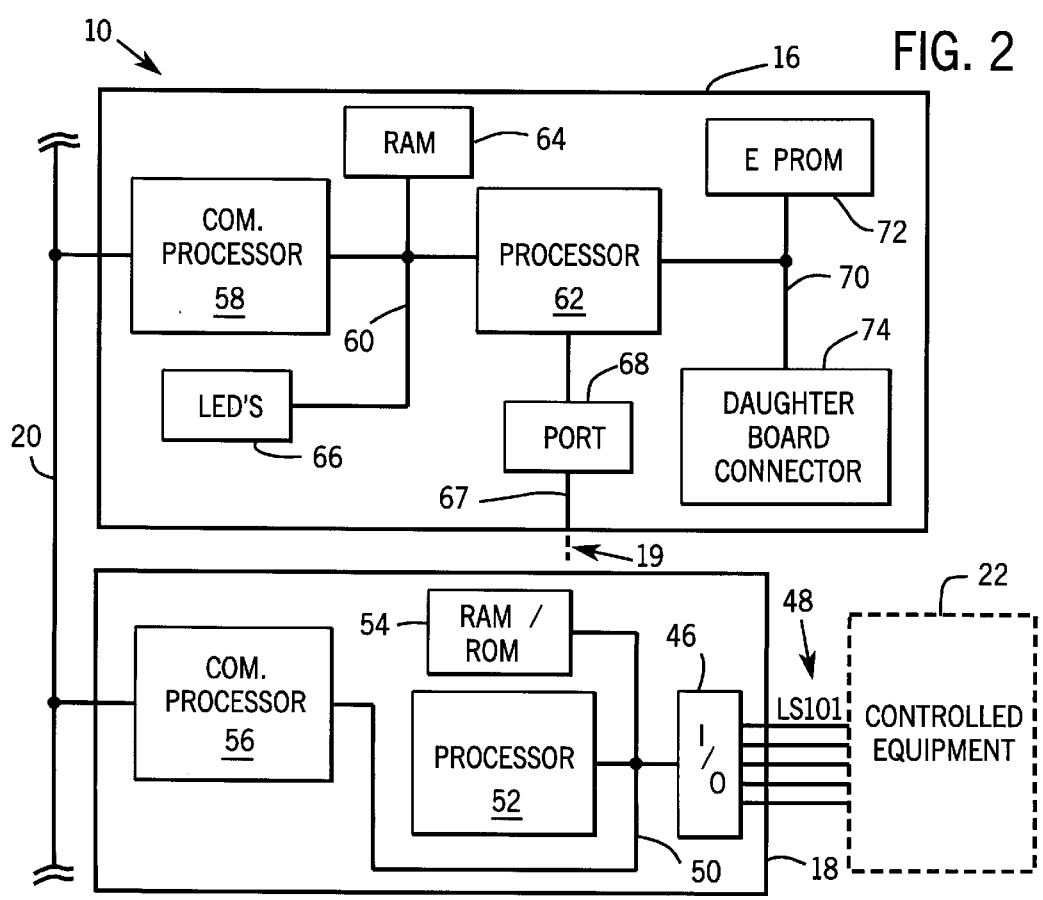
FIG. 2 is a block diagram of the controller of FIG. 1 showing the processor module, an I/O module, and the latter's connection to the controlled equipment of FIG. 1.

The automation controller 10 also controls, in the example, a conveyor belt 38 having cans 40 to be filled from the tank 24. The controller controls a spigot 42 from the tank 24 and the positioning of the conveyor belt 38 and receives signals from a limit switch 44 shown as a photoelectric beam so as to correctly position the containers under the spigot 42 for filling. Referring to FIG. 2, the signal lines 48 from the limit switch 44 (shown in FIG. 1) is designated LS 101, and will be used to initiate a task as will be described below.

2. Controller Architecture

Referring now to FIGS. 1 and 2, an automation controller 10 includes generally a rack 12 holding one or more controller modules including a power supply 14, a processor module 16, and one or more input/output "I/O" modules 18 connected together via a backplane 20 passing along the rear of the rack 12. I/O modules such as 18 are generally known in the art and operate to receive signals and transmit them to the processor module 16 under the operation of their processor 52. The processor module 16 receives inputs from controlled equipment 22 via the input/output modules 18 and provides outputs to the controlled equipment 22 by those same input/output modules 18.

The signal lines 48 from the controlled equipment 22 are received by the I/O module 18 at interface circuitry 46. The interface circuitry 46 contains protection circuitry, such as optical isolators, and conversion circuitry, such as analog to digital or digital to analog circuitry, for converting the I/O signals 48 to digital representations that may be transmitted on an internal bus 50 of the I/O module 18.

The internal bus communicates with an I/O module processor 52, a memory unit 54 composed generally of random access and read-only memory (RAM/ROM) and a communication processor 56 connecting the I/O module 18 to a high-speed backplane 20 for communication with other modules, and in particular, the processor module 16. Processor 52 thus may receive instructions and programming from the processor module 16 as will be described below. The I/O module 18 may be constructed according to methods well understood in the art.

A communication processor 58 in the processor module 16 handles the communication protocols of the high-speed backplane 20 and relays information between that high-speed backplane 20 and an internal bus 60 of the processor module 16. The internal bus 60 is also connected to the processor 62 of the processor module as well as random access memory ("RAM") 64 and a front panel LED display 66. The processor 62 provides a separate serial port 68 used for diagnostics and programming and another internal bus 70 communicating with erasable programmable read-only memory (EPROM) 72 and a daughter board connector 74 which may be used for memory expansion on a separate card.

Generally during operation, the processor 62 reads program instructions from the EPROM 72 and transfers data to and from RAM 64, that data representing desired inputs and outputs interchanged by the communication processor 58 with the I/O module 18 and thus with the controlled equipment 22. The general architecture and operation of the automation controller 10 thus far described will be familiar to those of ordinary skill in the art.

Figures 3, 6:
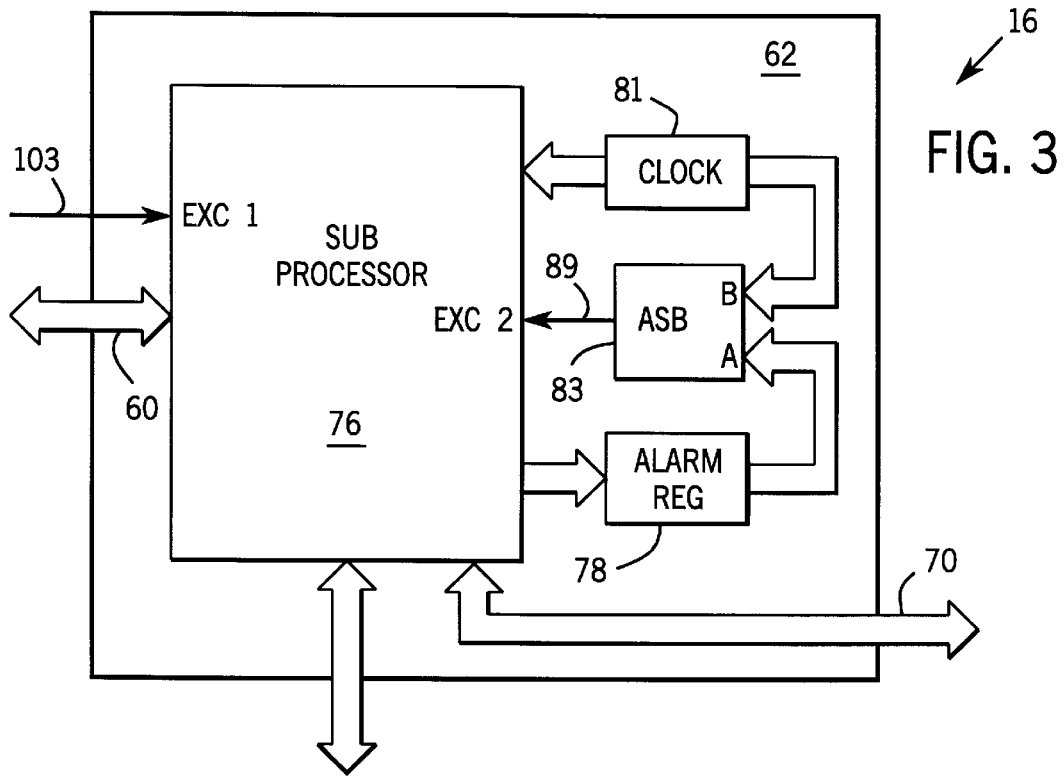
FIG. 3 is a more detailed block diagram of the processor of the controller of FIG. 2 showing the implementation of an alarm timer used for the multi-tasking scheduling.
FIG. 6 is a schedule list produced by the present operating system and used to program the alarm of FIG. 3 for the multi-tasking of the controller of FIG. 1.

Referring now to FIG. 3, the processor 62 of the processor module 16 incorporates specialized circuitry for providing an alarm signal to the processor 62 on a periodic basis without the need for software timing loops by the processor 62. Specifically, a subprocessor 76 of the processor 62 receiving a 32-bit time value from a clock 81 adds a predetermined timer interval to the value of the clock 81 and stores the sum in alarm register 78. When the value of clock 81 equals the value in the alarm register 78, a comparator 83 provides an exception signal 89 to the subprocessor 76 which serves to interrupt the subprocessor's execution of its program in EPROM 72 and causes the subprocessor to jump to a new program for execution, as will be described.

The subprocessor 76 is a custom integrated circuit adapted for rapid execution of industrial controller languages. However, it will be understood that the following invention will be equally applicable to general purpose microprocessors and is not dependent on particular details of the processor beyond those described here.

3. Tasks Run on the Controller

Referring now to FIG. 4, it is desirable, both for programming ease and processor efficiency, to divide a control program used to control the equipment 22 of FIG. 1 into a number of tasks 80. Each task 80, stored in memory 64, and having access to a global area of memory 64 is a part of the entire control program for controlling equipment 22, divided according to a logical separation in control tasks determined by the programmer. For example, in the application of FIG. 1, the feedback loops controlling the mixing in tank 24 may be separate tasks from those controlling the conveyor belt 38. The feedback loops are distinct from the control of the conveyor belt to the extent that each is synchronized only loosely with the other and control physically separate equipment. Thus, each can be developed separately. A further distinction between the process control of the feedback loops and the conveyor control is that the former is essentially free-running and requires little synchronization to outside events whereas the latter is episodic but needs a high degree of synchronization to outside events. The separation of a program into tasks reflecting these fundamental differences in character of the programming goal may be accommodated in the task scheduling system as will be described below.

Each task 80 includes a task control block 85 executed by the operating system 87 and one or more programs 82 within the RAM 64 or EPROM 72. The programs 82, as contained in RAM 64 or EPROM 72, need not be contiguous with particular tasks which refer to them. Generally, the task control block 85 includes: a name for identifying the task, pointers to one or more programs 82 associated with that task, and scheduling data as will be described below with respect to FIG. 5. The task control block 85 also identifies storage areas in RAM 64 used for storing values essential to resuming execution of the task 80, if the task 80 is interrupted, such as the contents of registers associated with subprocessor 76 and the location of the stack used by the subprocessor 76 in executing that task. This information from the registers and stack associated with the task are stored so when the task is resumed, there will be no loss of data necessary for the completion of the program.

As will be described in more detail below, the tasks 80 are run by the operating system 87 according to a schedule defined by the programmer from data entered into a task scheduling table 88. When a task 80 is invoked, a program associated with the task control block 85 begins execution of the programs 82 associated with the task 80 in sequence from a starting point to an ending point in each program. After the completion of each program 82, the program 82 returns control to the program of the task control block 85 so that completion of the program 82 within a certain period of time may be verified through a watchdog system as will also be described. The program of the task control block 85 then switches to the next program 82 of the task 80 so that the programs 82 seem to execute one after another.

4. Fault Handling for the Tasks

Each program 82 is also associated with a local fault handler 84 which is executed when the processor 62 encounters a predefined error during the execution of that program 82. Such error conditions include arithmetic overflows and other errors well known in the computer field as well as watchdog timeouts to be described. A system fault handler 86 is also associated with all tasks 80.

If a fault occurs during a program 82, the local fault handler 84 which is associated with the program 82 is executed to process the fault. If the local fault handler 84 does not address the fault, (indicated by a failure to clear the fault condition register), the system fault handler 86 is invoked and if the fault is then not addressed, the automation controller 10 shuts down and ceases execution of the tasks and their associated programs. Thus, fault handling is closely tied to the context of the fault as deduced from the program. This approach permits faults to be treated differently during execution of different programs depending on how critical they are to the correct operation of that program. This approach further recognizes that for some industrial control processes it may be better to operate the system with the possibility of error caused by the faults than to shut the system down with the certainty of attendant high costs.

5. Task Scheduling and Execution

Referring now to FIGS. 1 and 5, data defining each task 80 may be entered by the programmer through the programming terminal 19, or other terminal such as a microprocessor based computer, based on the programmer's knowledge of the overall operation of the controlled equipment 22 and the particular tasks and their criticality. This data is received by a task scheduling table 88 and used by the task control blocks 85.

As represented schematically, the task scheduling table 88 includes columns indicating a task name, a task priority, a task scheduling type, the task trigger condition, the programs 82 associated with the task, and a watchdog time value. The significance of the data entered into each of these columns may be explained by reference to example tasks forming the rows of the task scheduling table 88 and used to control the equipment 22 of FIG. 1.

A first task 90 incorporates two programs named "TEMP PID" and "FLOW PID" which control the temperature and flow of material in the tank 24. These programs implement feedback loops using a proportional-integral-derivative "PID" control algorithms. Although these algorithms may be quite complex, temperature and flow are generally slowly varying quantities and thus the programs need not be invoked at a high rate. Thus, these programs contained in task 90 are entitled: "slow loops" in the first column of the task scheduling table 88.

Normally process control is extremely sensitive to control failures insofar as an entire batch of materials and the equipment processing it can be ruined. For example, failure to properly agitate and maintain temperature of a resin could conceivably cause the resin to solidify in the mixing container destroying both the resin's commercial value and the container in which it is being mixed. For this reason, it may be desirable to make such process control tasks a high priority. Nevertheless, priority is relative to other tasks and in this example, the slow loops of task 90 are given a priority of 10 in the task scheduling table 88, a lower priority than any of the other programmer written tasks 80.

The scheduling of these programs of task 90 is periodic, that is, the user has entered data indicating that the task is periodic, i.e., that it should be performed periodically at a regular interval, in this case every 100 milliseconds as indicated in the condition column. This results from the fact that the control algorithms of task 90 require regular correction but need not be synchronized to an external event.

Each program of task 90 is also given a watchdog time value, in this case a 5 ms in the final column in the task scheduling table 88 of FIG. 5 indicating a period of time during which it is expected that the programs of TEMP PID and FLOW PID may be executed once from start to finish. This watchdog value is critical in the present multi-tasking insofar as it provides assurance that the highly variable event triggered tasks do not overtax the system resources.

As will be described, a timer holding the watchdog time runs after the program has begun regardless of whether the program has been interrupted by programs of other tasks and thus provides an ongoing indication of the amount of time taken to execute each program.

A second task 92 of the task scheduling table 88, entitled FAST LOOPS, incorporates a PRESSURE PID program which controls the pressure of the material within the tank 24. Here unlike the process programs of task 90, the controlled variable of pressure may change relatively quickly and thus the task is scheduled periodically on a 10 millisecond rate. It is nevertheless given a higher priority of 9 compared to the slow loops based on the relative importance of timely execution of these two tasks. Like the SLOW LOOPS task 90, the FAST LOOPS task 92 is periodic and has a watchdog time value of 5 ms.

A third task 94 entitled: FILL, in the task scheduling table 88 includes programs CAN STOP and CAN FILL that stop a can 40 underneath the spigot 42 and initiate a filling of the container from the tank 24. These tasks are required only when a can 40 has arrived at the tank 24 and thus there is no need to run this task 94 continuously as is done with SLOW LOOPS and FAST LOOPS tasks described above. Here therefore, the programmer has designated the FILL task 94 as an event triggered rather than a periodically triggered task. Event triggered tasks are those which are only invoked upon the occurrence of an external event, such as a change in an input signal from the controlled equipment 22 rather than simply the passage of time. In this case, the condition for the triggering is a closure of the limit switch 101 I/O line indicating a true state as indicated in the task scheduling table 88. This event is identified by an event ID sent by an I/O module as will be described. More than one event ID can be entered here, causing the task to be triggered by either of the events, and two or more tasks can have the same triggering event ID.

For this task 94, in contrast to the process loops tasks described above, although the can filling process is relatively slow, the program that must be run upon a can being detected is fast, requiring no complex computations and therefore the watchdog value can be 1 millisecond. Note that the programs CAN STOP and CAN FILL are written so as not to loop and wait while the can is filling. The fill task 94 is given a priority of 8.

A fourth task 98 designated MAIN includes a program AGITATOR CHECK and MAINTENANCE LOG, which in the example of FIG. 1, checks the operation of the agitator 28 to see that it is working and logs the hours of equipment usage in a table for maintenance purposes. These tasks essentially need to run continuously but have no strong demands of a particular period of execution or a triggering event. Also they are of low priority. Accordingly, they have been designated continuous as opposed to periodic or event triggered and are executed during a portion of any time remaining after any pending periodic or event tasks are executed. Although an extremely demanding use of the processor for the slow and fast loops of tasks 90 and 92 could conceivably prevent the continuous tasks from ever being executed, typically, the continuous task 96 will receive a substantial portion of the processor time in an acceptably loaded processor.

For the continuous tasks 96, the condition column contains a continuous allocation limit which allocates some percentage of the time that would normally be devoted to continuous tasks to other lower priority tasks 98 such as communications or other system tasks not entered by the programmer but used by the operating system 87.

The operating system 87 establishes its own tasks 100 at higher priorities than the user tasks 90 through 96. Also at a higher priority is the system fault handler task 102. These tasks are shown to establish the range of priorities actually observed by the operating system 87 but do not require any programmer input.

Referring now to FIG. 6, the operating system 87 reviewing the user data from task scheduling table 88 prepares in essence an occurrence queue 104 having one column listing "occurrences" defined as tasks or watchdog timers that are running, the latter which will be described below. Each occurrence is linked to an initiation time value associated with the 32 bit clock word from clock 81 of FIG. 3.

Each periodic task, when placed in the occurrence queue 104 will be associated with an initiation value equal to the current time of the clock 81 plus the period of the task obtained from the task scheduling table 88. More generally, the initiation value associated with a periodic task will be the clock value from clock 81 at the task's last time of execution plus the period of the task obtained from the task scheduling table 88.

Figure 7A:
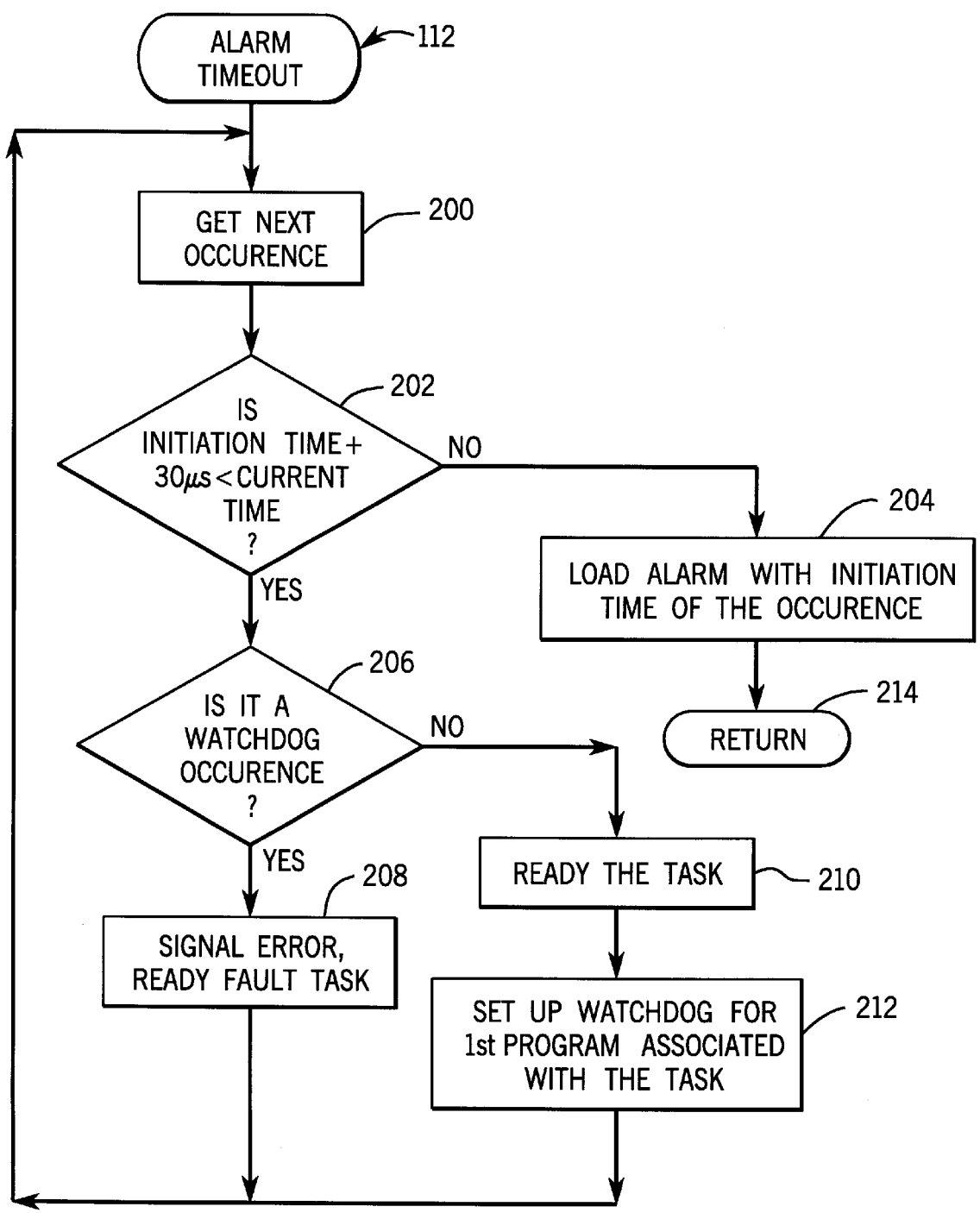
Figures 7B, 8:
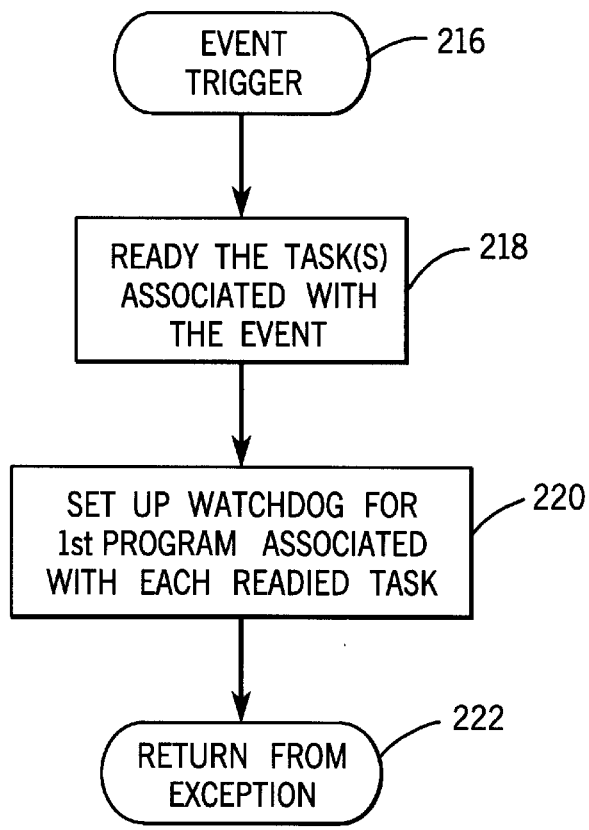

When an initiation time for a periodic task is reached, the task is transferred to a ready list 120 shown in FIG. 8 and providing a list of all tasks ready for current execution and their priority. For event driven tasks, the task is not placed in the occurrence queue 104 but moves directly to the ready list 120 when the triggering event occurs.

In either case, upon enrollment of a task in the ready list 120, a watchdog timer occurrence for the first program of that task is entered in the occurrence queue 104. This watchdog initiation time is equal to the initiation time of the task plus the watchdog time value of the first program, as listed in the task scheduling table 88. As each program completes execution, the watchdog timer of the next program associated with the task is entered into the occurrence queue 104.

Under the control of the operating system 87, the subprocessor 76 reviews the occurrence queue 104 to identify all occurrences having initiation times equal to or less than the clock value provided by clock 81 together with those occurrences having starting times within 30 microseconds of the clock value provided by clock 81. These latter occurrences are so close to the earlier occurrences for it to be impractical to treat them as different occurrences under the system.

Thus, for example, task 90, the SLOW LOOPS and task 92, the FAST LOOPS shown in the task scheduling table 88 with initiation times of 10274.000 ms and 10274.025 ms would be selected to be readied together. The initiation time of the next occurrence in the occurrence queue 104 is then loaded by the subprocessor into the alarm register 78 of FIG. 3 and the operating system 87 attends to other demands while it awaits an exception signal 89 from the comparator 83.

Referring now to FIGS. 5, 6 and 7(*a*), for a periodic task, the process of moving tasks from the occurrence queue 104 to the ready list 120 begins at process block 112 where an alarm timeout is received from comparator 83 shown in FIG. 3. As indicated in process block 200, at this time the occurrence queue 104 is reviewed to get the next occurrence, in the order of the occurrence's initiation times.

As indicated by decision block 202, if the next occurrence is ready for execution as indicated by its initiation time, the program proceeds to decision block 206.

At decision block 206, if the occurrence is a watchdog occurrence, indicating that a program associated with a ready task has failed to execute within the required time, the program proceeds to process block 208 and fault flags are set. The appropriate fault task is loaded into the ready list 120.

Otherwise, at decision block 206, if the occurrence is not a watchdog occurrence but a task, the task is readied, as indicated by process block 210, which places the task in the ready list 120, and the program proceeds to process block 212.

At process block 212, a watchdog occurrence for the first program 82 associated with the readied task is entered into the occurrence queue 104.

The operating system then proceeds back to process block 200 and the next occurrence is identified. If at subsequent decision block 202, the next occurrence is not ready for an execution, the program proceeds to process block 204 and the alarm register 78 (FIG. 3) is loaded with the initiation time of that identified next occurrence. The alarm servicing routine of the operating system then exits at block 214.

Tasks, that are of an event type such as task 94, are not triggered by the coincidence of an initiation time and the value of the clock 81 but rather by the receipt of an event signal indicating a change in the input or output identified in the condition column of the task scheduling table 88.

Referring to FIGS. 2 and 3, the detection of a change in an input or output identified in the task scheduling table 88 would normally consume considerable processor time because the processor would be required to almost continuously scan a list of inputs or outputs identified to events to generate the necessary event signal if one of those inputs or outputs changed.

In contrast, in the present invention, the responsibility for identifying the events is transferred to the I/O modules 18. In particular, upon initiation of the operating system 87, the processor 62 reads the task scheduling table 88 for event triggered tasks and transmits a message through the backplane 20 to the I/O module 18 causing the I/O module to undertake a review of that event on a periodic basis as required. In this manner, the burden of detecting events is shifted from the subprocessor 76 to the I/O modules. Large control systems with multiple I/O modules 18 will have correspondingly greater resources for detecting multiple events.

Upon detecting an event, the I/O modules 18 send a message having a special character string to the communication processor 58, the character string indicating that the messages signal an event. The message also contains information that allows the controller to identify the event. The task scheduling table 88 identifies the tasks associated with the event. The communication processor 58 provides an exception input 103 to the subprocessor 76 in the same manner as that of the alarm register 78, clock 81 and comparator 83. Only upon occurrence of this exception input is the operating system 87 interrupted to read the message and recognize the particular task that has received a trigger.

Upon receipt of such a trigger, the task associated with the triggering event is placed in the ready list 120, and the watchdog occurrence of its programs are placed in the occurrence queue 104 and receive an initiation time equal to the value of the clock 81 and the watchdog time value.

Specifically, an event trigger, as indicated by process block 216, causes the operating system to immediately ready the task associated with that event by placing it in the ready list 120 as indicated by process block 218 and in a manner similar to previously described process block 210.

A watchdog occurrence for the first program 82 associated with the readied event triggered task is then entered into the occurrence queue 104 as indicated by process block 220 and the program returns at process block 222.

A continuous task, such as task 96 is permanently enrolled on the ready list 120 together with its priority.

Referring now to FIG. 7(*c*), the life of a task begins with the entering of task data indicated by process block 230. The operating system then generally waits at process block 232 for entry of the task into the ready list 120 per FIGS. 7(*a*) and 7(*b*) as described above. Once a task is readied, the first program of the task is executed once to completion from a starting point to an ending point as indicated by process block 234. At subsequent decision block 236, task scheduling table 88 is consulted to see if there is another program associated with the task. If not, then at process block 238 the watchdog occurrence previously enrolled in the occurrence queue 104 is canceled and the program returns to process block 232 to wait for the task to be readied again.

If at decision 236, however, there is another program associated with the task, then at process block 240 the next program is loaded, the current watchdog for the program just executed is canceled and the watchdog for the next program is set up as an occurrence in the occurrence queue 104. The next program is then executed by jumping to process block 234.

This process will continue until there are no more programs associated with the tasks that have not been executed once. At this point the watchdog occurrence for the last program will be canceled and the task will be readied once again as described with respect to FIGS. 7(*a*) or 7(*b*).

As described above with respect to FIG. 7(*c*), the ready list 120 is examined by the operating system 87 and the highest priority tasks identified. If the highest priority task has a priority higher than a task currently being executed (in yet another system task), then the task being executed is suspended (its values are saved so that it may be run again from the point at which it was suspended) and the new task of higher priority is run. When the task identified as being of higher priority is finished, it is removed from the ready list 120 and the next task of lower priority on the list (suspended or never run) is executed. Thus, event tasks of higher priority displace periodic tasks of lower priority, and periodic tasks of higher priority displace event tasks of lower priority. Multiple tasks of the same priority are run on a time slice basis equally sharing the processor without regard to the type of triggering of the task (periodic or event).

The continuous task executes only when there are no other tasks on the ready list 120 due to its having the lowest priority.

Thus, the present invention permits a dynamic scheduling of mixed trigger type tasks: both those that occur periodically on a regular basis, and those that can occur at any time based on an event occurrence. This ability to integrate both event driven and periodic type tasks permits greater efficiency in the use of the processor by avoiding the need for the processor to execute event driven tasks that are time critical at a high rate when the events are not pending. The use of watchdog times keyed to each program of a task permits this dynamic scheduling to operate in the critical environment of industrial control by providing a clear indication of processor overload and the failure of critical tasks to be promptly executed. In addition to tracking elapsed real-time during the execution of a task, the present invention may also track the actual execution times of each task. These statistics may be used empirically to determine the proper load of the processor or a given control system which vary depending on the actual machinery being controlled.

II. Hardware Monitoring of Control Program Execution

1. Breakpoint Detection

Referring now to FIG. 9, the subprocessor 76 incorporates a first and second processor element 250 and 252, each specialized to execute a particular set of instructions.

Generally first processor element 250 is optimized for the execution of relay ladder language and other specialized languages addressing the particular need of real-time industrial control. Second processor element 252 is a general-purpose reduced instruction set computer ("RISC") providing a limited but more generalized instruction such as is known generally in the art. The first processor element 250 and the second processor element 252 communicate with each other via secondary bus 254 having 32 address lines, 32 data lines, and a number of control lines to be described below. The bus interface 258 provides for the addressing of the RAM 64 and EPROM 72 through only 22 or 24 address bits, respectively.

The operation of the secondary bus 254 is according to general principles well known in the art and permits the first and second processor elements to communicate with a port interface 256 providing port signal 67 and with a bus interface 258 providing communication with the internal buses 60 and 70 described above. The secondary bus 254 also communicates with breakpoint logic circuitry 260 which monitors the address and control lines of the secondary bus 254 (according to instructions previously received on the data lines of the secondary bus 254) to provide a breakpoint signal on abort input 262 to both the first processor element 250 and second processor element 252 as will be described in more detail below. Generally, only the active processor element 250 or 252 detects the breakpoint. Further, if the active processor is the first processor element 250 then it suspends execution and returns control to the second processing element 252.

Referring to FIGS. 9 and 10, the breakpoint logic circuitry 260 includes a multiple bit comparator 263 that may compare the address on secondary bus 254 to values contained in registers B1 264, and B2 266 in order to generate the breakpoint signal on the abort input 262. Each of registers B1 and B2 may receive a 25 bit address via the data lines of the secondary bus 254 which is then used to establish a range of addresses that will generate the breakpoint signal on the abort input 262. The breakpoint signal is separate from general processor interrupts as are known in the art. When the breakpoint signal occurs, interrupts are disabled to prevent task switching until the breakpoint signal is processed.

The comparator 263 logically compares the values in registers B1 and B2 to the least significant 25 bits of the addresses on the secondary bus 254 according to instructions contained in a condition register 268. Condition register 268 provides further conditions to the generation of a breakpoint signal according to the setting of its 32 bits as listed in Table 1.

TABLE 1

| Bit No. | Action |
| --- | --- |
| 0 | Generate breakpoint signal if address is greater than 16 Mbytes |
| 1 | Reserved |
| 2 | Enable breakpoint if B1 is < address |
| 3 | Enable breakpoint if B1 = address |
| 4 | Enable breakpoint if B2 is > address |
| 5 | Enable breakpoint if B2 = address |
| 6 | Generate breakpoint signal if B1 OR B2 is true (if this bit is reset B1 AND B2 must be true) |
| 7 | Reserved |
| 8 | Generate breakpoint only if instruction fetch |
| 9 | Generate breakpoint only if read cycle |
| 10 | Generate breakpoint only if write cycle |
| 11 | Byte level resolution of breakpoint |
| 12 | Half word resolution of breakpoint |

TABLE 1-continued

| Bit No. | Action |
|---|---|
| 13–24 | Reserved |
| 25–31 | Generate breakpoint delay |

The first bit of the condition register 268 instructs the comparator 263 to generate a breakpoint signal if the addresses of memory being accessed is over 16 megabytes, the limit of the memory space of the controller 10. Such addresses are outside the memory space and are necessarily erroneous.

Bits 2–5 define the Boolean conditions under which the values in registers B1 and B2 will be interpreted. Generally if bit 2 is set, bit 3 should be set as well and if bit 4 is set, bit 5 should be set as well. Thus, either register B1 (or B2) may define a LESS THAN (GREATER THAN) or a LESS THAN OR EQUAL (GREATER THAN OR EQUAL) condition for the breakpoint to occur.

Bit 6 provides the logical combination of the registers B1 and B2 to identify a range of address values that will cause a breakpoint. By setting this bit, a breakpoint is generated if the global memory address is outside of the addresses between B1 and B2 (if B1 is a higher value than B2). If this bit is reset, then a breakpoint is generated if the global memory address is within the range of addresses between B1 and B2 (if B1 is a lower value than B2). The first configuration may be useful for detecting tasks which are affecting memory outside of their intended range. If only bits 3 or 5 are set, indicating an equals only condition, and this bit is set, a breakpoint will be generated if the address equals the value in B1 or the value in B2.

Bits 8–10 provide additional conditions for generating the breakpoint signal, in particular, whether the memory access is an instruction fetch as determined by bit 8 (that is the processor believes it is reading an instruction rather than data). The breakpoint signal may be restricted to situations where a read from global memory is being performed (by bit 9) or to situations where a write to global memory is being performed (by bit 10). Each of these conditions is detected by the comparator 263 reading the control lines within the secondary bus 254.

Bits 11 and 12 determine whether the least significant bits of the registers B1 and B2 will be considered in the address comparison process and thus whether the breakpoint resolves to a byte (8 bits), a half word (16 bits), or a full word (32 bits) if neither bits 11 nor 12 are set. Bits 25 through 31 provide a setting of a counter within the comparator 263 which determines the number of breakpoint conditions which must be detected prior to the abort being generated on abort input 262. Thus, for example, the third "read" from a particular memory location may be used to generate the breakpoint signal.

The information of these registers 264 through 268 is typically entered by the programmer through terminal 19 during evaluation of the task software during operation conditions.

When a breakpoint signal is generated on the abort input 262, a snapshot register 270 stores the information shown in Table 2 to assist in verifying the condition of the abort.

TABLE 2

| Bits | Meaning |
|---|---|
| 0–24 | Address bus value when breakpoint signal occurred |
| 25 | Address was equal to register value |
| 26 | Address was less than register value |
| 27 | Out of range abort |
| 28 | Value in register B1 matched address when breakpoint occurred |
| 29 | Value in register B2 matched address when breakpoint occurred |
| 30 | Instruction fetch was occurring when breakpoint occurred |
| 31 | Processor was writing when breakpoint occurred |

Thus, the first 25 bits of the snapshot register 270 confirm the address on the secondary bus 254 when the breakpoint signal occurred. This value is important when breakpoint is programmed to occur within a range of addresses.

Bits 25, 26, 28, and 29 indicate (by being set) the condition causing the breakpoint signal and, in particular, which register B1 or B2 provided the decisive condition in the case of an OR logic and whether the address was less than or equal to that register value.

Bit 27, when set, indicates that the breakpoint signal was caused by an attempt to access memory that was out of range.

Bit 30 being set indicates that an instruction was being fetched, and bit 31 indicates whether it was a read or a write condition.

This basic information in the snapshot register is supplemented by a breakpoint record routine stored in memory and executed when the breakpoint signal is received by processor element 250 or 252 on the abort input 262. Upon the occurrence of the breakpoint signal, detected by the second processor element 252, that processor element executes a routine pointed to by an interrupt vector according to methods well understood in the art. This routine collects, among other values that may be selected by the programmer, an indication of the current task 100 being executed when the breakpoint occurred. In the event that a single memory location is being trapped, the value of the data in the memory location may be stored. The breakpoint record routine also saves and displays to the operator information about the status of the various tasks as is provided in occurrence queue 104 and ready list 120 described above. Thus, the breakpoint record routine provides important information as to the interaction of the memory of RAM 64 and 72 and the processor 62 during the execution of multiple tasks as affected by the actual operation of the controlled equipment. Additional uses of the breakpoint record routine will be described below.

Upon the occurrence of a breakpoint signal detected by processor element 250, processor element 250 stops execution and provides a vector to processor element 252. This vector is the address of a routine similar to that used above for the breakpoint detected by processor element 252. This enables a single routine to be executed by processing element 252 to collect information about breakpoints.

It is important to note that because the controlled equipment and the timing of the processes it controls can substantially affect the order and duration of the execution of tasks, the breakpoint logic circuitry 260 is useful in evaluating unexpected conditions that occur only rarely. As a separate circuit element from the processor elements 250 and 252, the breakpoint logic does not delay the execution of the tasks during normal operation.

2. Monitoring Execution of Rungs

Referring now to FIGS. 11 and 13, a control task executed by processor module 16 shown in FIG. 2 may be stored in RAM 64 at addresses 300 in the form of sequential instructions 302. For clarity, only the last few digits of each address are depicted.

Generally, each instruction 302 has a corresponding graphical element such as contacts 308 or coils 310 (instructions XIC and OTE, for example) that may be displayed on the screen 304. Some graphical elements are in the form of interconnecting wires, such as for instructions BST and BND and SOR, which form the beginnings and endings of branches or the beginnings of rungs respectively. Standard ladder logic instruction mnemonics are provided below in Table 3. It will be understood in the art, however, that graphical elements beyond those described here and their corresponding instructions may also be used and that the following discussion is not limited to relay ladder logic programs, but any programs normally displayed through interconnected graphical elements.

TABLE 3

| Relay ladder Logic Mnemonic | Meaning |
| --- | --- |
| STR | Start of Rung |
| BST | Branch Start |
| XIC | Normally Open Contact (examine if closed) |
| XIO | Normally Closed Contact (examine if open) |
| NXB | Next Branch |
| BND | Branch End |
| OTE | Output Coil (Output Enable) |
| END | End of Rung |

The instructions 302 are grouped into functional elements termed "rungs" according to their graphical representation on display screen 304 as rungs 306 in a ladder diagram of interconnected contacts 308 and coils 310. Each rung 306 begins with a SOR (start of rung) instruction, thus providing a clear indication of the division of the program according to its graphical representation.

Generally, the creation of the relay ladder logic program is done by the operator through the terminal 19 or at a remote terminal and later downloaded into the RAM 64. Rules for generating and displaying relay ladder language programs and commercial products for writing and editing said programs are well known in the art.

Referring still to FIGS. 11 and 13, the example relay ladder program displayed on display screen 304 provides two rungs 312 and 314. Rung 312 has a series connected normally open contact 308 for input value F wired in series with a normally closed contact 308 for input value B. These series contacts are shunted by a parallel connected normally open contact 308 for input value C, and the combination connected in series with output coil 310 for output value F. The instructions for this rung 312 are SOR BST XIC(F) XIO(B) NXB XIC(C) BND and OTE(F).

The input and output values refer to data contained in an I/O image table 340 separate from the ladder logic program 319, but also within RAM 64. As is understood in the art, the input values of the I/O image table 340 are constantly updated with signals from the controlled equipment and the output values are constantly relayed to the controlled equipment.

Rung 314 has normally open contacts for input values F, D, and B, connected in series with output coil 310 for output value B. The instructions for this rung 312 are SOR XIC(F) XIC(D) XIC(B) OTE(F).

Because of the finite screen area of display screen 304, typically only a few rungs of the entire control program may be displayed at any given time. The rungs 312 and 314 displayed on display screen 304 may be changed to later or earlier rungs by scrolling the display screen 304 according to methods well known in the art. The point at which the program is displayed is controlled by a display pointer 320 indicating an address in RAM 64 for the SOR instruction of the first rung to be displayed on display screen 304. In the example of FIGS. 11 and 13 the display pointer 320 points to an SOR instruction at memory address location—5.

Figure 16:
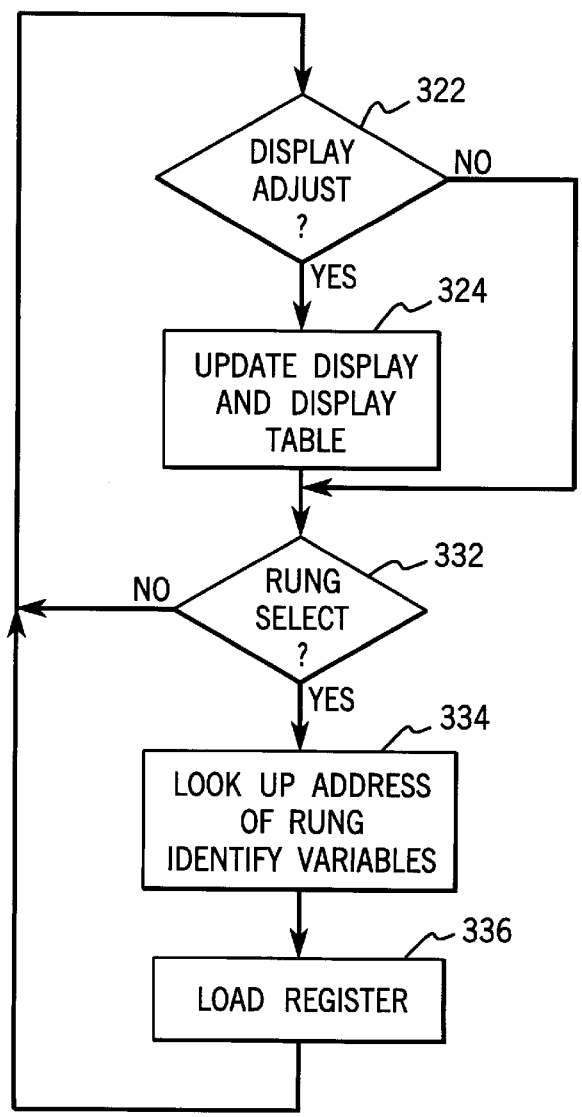
FIG. 16 is a flow chart depicting the process of selecting a rung depicted in FIG. 11 for the monitoring of execution of the control program of the present invention.

Referring now to FIGS. 11, 13, and 16, during a first step of the monitoring program indicated by decision block 322, the user terminal is polled to see if user commands have been entered indicating that movement of the display pointer 320 and hence a scrolling of display screen 304 is desired. If so, the program proceeds to process block 324 and the display pointer is moved forward or backward in the program 319 and the display screen 304 is refreshed so that the instructions 302 at and following the display pointer 320 are displayed on the display screen 304.

At this time, a screen table 326 shown in FIG. 14 is revised, the screen table 326 matching zones 328 on the display screen 304 (demarcated on FIG. 11 as dotted lines) to the address of the SOR instruction (the first instruction) for the rungs within those zones 328. Specifically, the screen in FIG. 11 is divided into four horizontally extending zones 328A–C, each corresponding generally to one branch or rung of the relay ladder diagram as displayed. Each zone 328A–C has an entry in the screen table 326 which holds the address in memory 64 of the first instructions 302 for the rung 306 displayed in that zone. Thus, the zone A holds the memory address—5. Zone B below zone A holds a first branch of that same rung and hence the second entry of the screen table 326 also holds memory address—5. At the next zone C, there is a new rung having a first instruction at memory address—13; hence, memory address—13 is entered in the third entry position of the screen table 326. Typically there will be many more entries in the screen table 326 corresponding to a higher density of display screen 304.

A cursor 330 shown in FIG. 11 in the form of an image of a magnifying glass may be moved between the zones 328A through 328C by means of cursor control keys on the terminal 19 or a conventional cursor control device such as a mouse (not shown). With the cursor 330 positioned on the image of a rung 306 to be monitored, (for example, at the leftmost junction of the rung and the power rail) the user may press a key on the keyboard of terminal 19 to select that rung and to indicate a desire to review the operation of the rung 306 selected.

The cursor location is readily decoded into one of the zones 328A through 328C, and the screen table 326 is examined to determine the starting address 338 of the rung 306 of interest. This selection of a rung 306 is indicated by decision block 332 and the obtaining of the address from the space table indicated by process block 334.

At succeeding process block 336, the starting address 338 of the first instruction 302 for the rung 306 of interest is loaded into register B1 of the breakpoint logic circuitry 260, described above, and the condition register 268 is set to enable the breakpoint if register B1 equals the address at which memory is accessed. Also, at process block 336 all variables referenced by instructions 302 from the beginning of the breakpoint address 338 to the next SOR instruction are identified for use by the breakpoint record routine to read the values of these variables and record them as will be described further below.

A breakpoint signal will be generated on abort input 262 (shown in FIG. 9) when the program reads the electronic memory 64 to fetch the SOR instruction at the breakpoint address 338 as selected by the cursor 330.

Because two registers B1 (264) and B2 (266) may be loaded into the breakpoint logic circuitry 260, two separate breakpoints may be readily programmed; thus the execution of more than one rung may be detected and monitored as will be described.

Referring now to FIG. 11, during execution of the control program, the breakpoint record routine, as described above, executes as a task when the address indicated by the breakpoint pointer 338, in this case—13, is detected on the bus 254 and thus the processor is implicitly accessing RAM 64 through bus 60. The breakpoint record routine, executing typically as a high priority task, reads and stores the input values and output values previously identified for the rung to be highlighted, sets a flag indicating the execution of the rung to be used by a display routine, and reads a clock value (normally updated as yet a separate task according to methods well-known in the art) to provide an indication of when the rung was executed. In the present example at the time of execution of the rung starting at memory address—13, the breakpoint record routine would store the values of variables F, D, G, and B.

The separate display routine that may be executed as a lower priority task, updates an execution histogram window 342 based on data collected by the breakpoint record routine. The histogram window 342 lists the rung 306 being monitored, in this case rung 13 not to be confused with its address—13, followed by a time at which the rung was executed, as was stored also by the breakpoint record routine. At each succeeding execution of the display routine, if new execution data has been collected, the histogram window 342 is scrolled down one or more lines to place new data at the top of the list so that a running list of execution times of the rung are listed.

Figure 15:
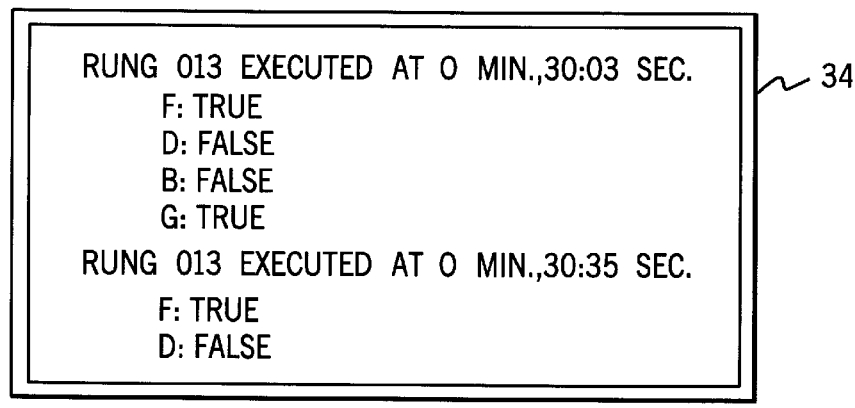
FIG. 15 is a detailed version of FIG. 11 showing an alternative detailing of the execution of the rungs of FIG. 11, which includes the states of the input and output values associated with the monitored rung.

Referring now to FIG. 15, in a second embodiment, the contact histogram window 342 may be beneath each line of text indicating the execution of the rung by rung number and the time of execution, provide the state or value of each variable referred to in the instructions of the rung 306 so that the logical operation of the rung 306 may be verified, and in particular, the desired inputs and outputs at a single instant in time may be confirmed. Thus, selection of the graphical image of the portion of the control program forming the rung 306 also provides data as to the variables of contacts 308 and coils 310 whose graphical images are part of the rung image.

Based on the results of the breakpoint routine, the display routines may also highlight the display, in particular the rung itself, to show that it is being executed. Normally, this is done by making the rung lines brighter on the display screen 304. In addition, the state of the variables, such as contacts and output coils, may be indicated by highlighting the graphical elements associated with those variables.

In an alternative embodiment, the display screen 304 may be divided into much smaller areas so that the cursor 330 may be placed on top of a particular graphical element for an input or output value (e.g., contacts 308 and coils 310) to produce a window describing the value of that data variable over time. It must be noted, however, that the problem of determining the execution times of the rungs, as described first, is substantially more complex than that of determining the values of the input or output values insofar as the state of execution of the rungs is not recorded in any separate location such as the I/O image table 340. Thus, without the method of the present invention, there is no direct record or indication as to whether a rung 306 has been executed.

It will be understood that, the present invention, by employing separate breakpoint logical circuitry which operates in parallel with the first and second processor elements 250 and 252, does not significantly increase the execution time of the control program. In fact, the processor elements 250 or 252 are interrupted only when the rung is executed. In contrast, an attempt to detect the execution of the particular rungs through the insertion of special reporting routines in the control program itself might jeopardize the integrity of the control program and certainly changing the conditions under which it operates, such as might cause the results of the troubleshooting to be ambiguous.

III. Software Monitoring of Control Program Execution

The multi-tasking operating system 87 of the automation controller 10 provides an opportunity for a second, software method of monitoring the value of particular input or output data 48. This software technique relies on the fact that different tasks 80 running in the controller 10 share global memory and thus one task 80 can read the data of another task 80.

Referring now to FIG. 17, in the present invention, a monitoring task 400 is generated which periodically reads the data used by a control program running as a separate task 80, for later display.

The ability to monitor the control program with another software task requires that the second task (the monitoring task 400) be invoked frequently so that changes in the data used by the control program are not missed. This in turn requires that the monitoring task 400 be extremely rapid in execution so that its frequent invoking will not adversely affect the execution speed of the control program with possibly disastrous consequences to the controlled process.

A high speed of execution in the monitoring task 400 is obtained, in part, by simplifying the monitoring task 400 to the minimum number of steps necessary to record the data. The responsibility for displaying the data collected by the monitoring task 400 is placed in either a separate task or a separate computer communicating with the controller by means of the communications network.

As a result, the monitoring task 400 need only perform four tasks: (1) reading a pre-designated memory location for each input or output data being monitored; (2) comparing the value of the data in that memory location to a previously stored value, and only if the value has changed, (3) storing the new value in memory (for later comparisons) and (4) storing the time of the change of the value (the current time).

The present inventors have determined that these steps may be executed on current hardware as frequently as every 1 millisecond without adversely affecting the execution of many typical control programs.

Referring then still to FIG. 18, the monitoring task 400 begins with the reading of a designated memory address indicated at process block 402. The memory address is the location in the memory of the controller 10 where the value of the input or output data is stored and may be identified by the user, for example, as described above with respect to FIG. 11, by highlighting a portion of a graphical interpretation of the control program (e.g., a rung or contacts of a ladder logic program). Screen table 326 is then reviewed to identify the appropriate memory address in the I/O image table 340.

Alternatively, a "tag" such as the letters "F" "D" "B" on rung 314 may be entered directly and a symbol table (not shown) familiar to those of ordinary skill in the art, may be used to find the appropriate memory address in the I/O image table 340. Referring to FIG. 19 the tag may be selected from a list of tags for the control program, the list displayed upon pressing of a tag button 413 on a user entry screen 401. The selected tag name is then displayed at field 415.

At decision block 404, the data read from the memory address is compared to its last value which has been previously stored as will be described. If no last value has been stored, the data is compared to a default value of zero.

If there is no change in the data of the tag, as is often the case, the monitoring task 400 ends. In this situation, the burden of executing monitoring task 400 on the performance of the control program is very little.

On the other hand, if at decision block 404 there has been a change in the data of the tag, the monitoring task 400 stores in memory the current time as indicated by process block 406 together with the current value of the data (to be used in the next comparison at decision block 404). The storage area in memory may be a circular buffer, constantly writing new data over old data so that the total storage area does not increase. The data to be written over may be saved to a disk drive or the like by a separate task if so indicated by the user by selecting switch 417.

These four steps of monitoring task 400 can be executed rapidly.

Referring now to FIG. 18, a separate display task 410 reads and displays the contents of the circular buffer into which the data and time have been stored per process block 406 of FIG. 17. This reading and displaying is indicated in FIG. 18 as process block 408.

Referring still to FIG. 19, display task 410 may display in display area 412, a histogram similar to that of FIG. 15, providing an "Elapsed Time" calculated by a subtraction of the current time when task 410 is running from the time stored by monitoring task 400, a "Delta Time" calculated by subtractions of successive elapsed times, and the value of the data stored by monitoring task 400. In an alternative embodiment, the display area may plot, on a vertical axis, the value of the data against a horizontal axis of elapsed time. Other graphical displays of the data described, such as bar charts and frequency histograms, may also be created according to methods well known in the art.

Referring to FIG. 19, the control screen 401 may also be used to provide data to the task scheduling table 88 which schedules the monitoring task including the period of the execution of the monitoring task 400 which ultimately defines how accurately the time of change of a given input or output variable may be determined. This data may be entered into field 414. The control screen 401 may also be used by the user to indicate the format, either binary or decimal, in which the value of the data will be displayed selected at window 416 and entered according to techniques well known in the art.

A mask may be entered at field 418 of the control screen 401 and allows the comparison process of decision block 404 of FIG. 17 to be made not on the entire value of the data, but only of a portion of the data designated by the mask. For example, for a 32 bit binary data, an eight digit hexadecimal mask of FFFF FFFF (corresponding to a 32 bit binary word of all ones) would designate that the comparison of decision block 404 be made with respect to all the bits of the data collected at process block 402. On the other hand, an eight digit hexadecimal mask of OOOO FFFF (corresponding to a 32 bit binary word of sixteen zeros followed by sixteen ones) would designate that the comparison be performed only on the least significant digits of the data value.

Specifically, the comparison process of decision block 404 first takes an EXCLUSIVE OR of the corresponding bits of the current data in the memory location and its previous value. The operation generates a new word of comparable length where ones indicate bits in the current data word that have changed. This new word may be ANDed with the mask and if the resulting product is zero, no change is assumed to have occurred even though individual bits may in fact have changed.

As is the case with all tasks 80, monitoring task 400 may also be event driven to occur when certain events transpire. Thus, an even lower processor overhead may be imposed by the monitoring task 400.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. A method of displaying the real-time status of input/output data exchanged between a multi-tasking industrial controller executing a control program and a control process, the method comprising the steps of:

(a) executing the control program as first of at least two concurrent tasks on the multi-tasking industrial controller;

(b) accepting an input from a user identifying an input/output datum referenced by the control program;

(c) identifying a memory location in the industrial holding the input/output data;

(d) generating a memory monitor program to be run as a second of at least two concurrent tasks on the multi-tasking industrial controller, the memory monitor program receiving the memory location identified in step (c) and monitoring the memory location to record the time of a change in the data in the memory location;

(e) executing the memory monitor program concurrently with the control program; and (f) displaying the recorded time of change.

2. The method of claim 1 wherein step (f) is performed by a program running concurrently independently of the control program and the monitoring program.

3. The method of claim 1 wherein step (b) includes the steps of:

(1) displaying on an electronic display a graphical representation of a portion of the control program referencing the input/output datum identified by a tag name; and (2) using the tag name as the user input.

4. The method of claim 3 wherein the graphical representation displayed in (1) is a display of interconnected schematic elements of relay contacts and coils labeled with written tag names, one schematic element representing the input/output datum.

5. The method of claim 1 wherein the concurrent execution of the control program task and the memory monitor task is performed by switching between the execution of the two tasks on a periodic basis.

6. The method of claim 5 wherein the step (b) also accepts from the user a time value and wherein the periodic switching is on an interval equal to the time value.

7. The method of claim 1 wherein the concurrent execution of the control program task and the memory monitor task is performed by switching between the execution of the two tasks based on the state of a second input/output datum.

8. The method of claim 1 wherein the displaying of step (f) presents a list of the times of change of the datum and the difference between successive such times of change.

9. The method of claim 1 wherein the displaying of step (f) plots a value of the datum against the time of change.

10. The method of claim 1 wherein the displaying of step (f) plots a frequency histogram of datum values.

11. The method of claim 1 wherein the displaying of step (f) presents a list of predetermined length with the latest time of change replacing the oldest time of change.

12. The method of claim 1 wherein the step (b) also accepts from the user a mask having set binary bits and wherein the memory monitor generated at step (d) ignores times of changes of bits of the datum corresponding to set bits in the mask.

* * * * *